June 24, 1947.  R. T. McELHOSE ET AL  2,423,069
SWIVEL ATTACHMENT FOR COUPLERS
Filed Feb. 13, 1945  2 Sheets-Sheet 1

INVENTORS
ROBERT T. McELHOSE
RICHARD R. FARRELL
BY
Leonard L. Kalish

Patented June 24, 1947

2,423,069

UNITED STATES PATENT OFFICE 2,423,069

SWIVEL ATTACHMENT FOR COUPLERS

Robert T. McElhose and Richard R. Farrell, Oakmont, Pa., assignors to Universal Lubricating Systems, Inc., Oakmont, Pa.

Application February 13, 1945, Serial No. 577,703

7 Claims. (Cl. 285—96.3)

The present invention relates to coupler attachments for pressure lubricating systems or the like and it relates more particularly to swivel-type attachments for hydraulic couplers or the like.

An object of the present invention is to provide a coupler attachment for a pressure lubricating system. Another object of the present invention is to provide an attachment for the coupler in a pressure lubricating system which will permit the coupler to be rotated independently of the lubricant delivery line for ready attachment to fittings or nipples or the like. Still another object of the present invention is to provide an attachment adapted for connection intermediate the hydraulic coupler and the grease line of a pressure lubricating system, which will permit a free swivel action of the coupler in order to facilitate connection to differently-positioned and relatively inaccessible lubricant-receiving fittings or nipples, and which will automatically lock the coupler in predetermined position upon passage of grease therethrough.

Other objects and advantages of the present invention are apparent in the following detailed description, appended claims and accompanying drawings.

For the purpose of illustrating the invention, there is shown in the accompanying drawings one form thereof which is at present preferred, although it is to be understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1:
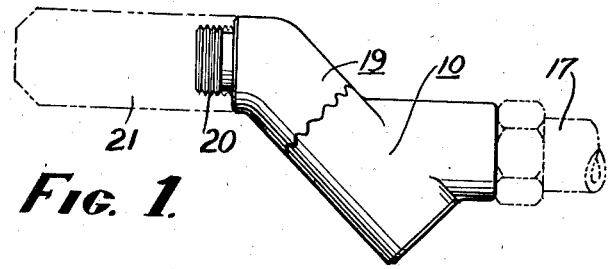
Figure 1 represents a side elevational view of one embodiment of the present invention shown as it appears connected to a horizontally-disposed coupler.
Figure 2:
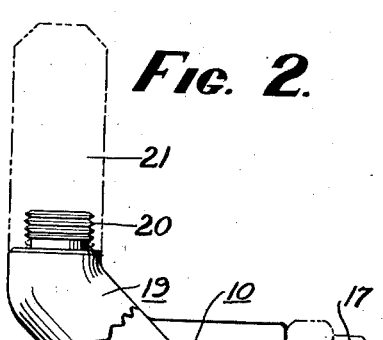
Figure 2 represents a view generally similar to that of Figure 1 but showing the swivel attachment rotated to position the hydraulic coupler generally vertically.

In one embodiment of the present invention shown generally in Figures 1 to 7, we may provide a swivel attachment for a hydraulic grease coupler which includes a generally Y-shaped base member 10 (which may be of aluminum or any other suitable material). The base member 10 includes a main arm 11 and a side arm 12 disposed generally at a 45 degree angle to the main arm 11.

A generally cylindrical bore 13 is provided within the main arm 11; a somewhat reduced opening 14 being formed at the forward end of said arm.

A screw-threaded socket 16 is provided at the rear end of the side arm 12 and is adapted for detachable connection to a fluid line 17; the other end of the fluid line 17 being conneceted to any conventional means (not shown) for delivering grease or the like under pressure. The side arm 12 is also provided with a conduit 18 which connects the socket 16 with the cylindrical bore 13 of the main arm 11.

The swivel attachment also includes a front member or cap 19 (of aluminum or any other suitable material) which is bent at a generally 135 degree angle and which is adapted for connection to the base member 10 in a manner to be hereinafter described. The member 19 is provided with an externally screw-threaded neck portion 20 which is adapted for detachable connection to a grease coupler 21, which may be a hydraulic or any other conventional type of coupler.

A conduit 22 extends inwardly from the neck portion 20 of the member 19, and communicates, at its inner end, with an enlarged internally screw-threaded opening 23 which is generally at a 135 degree angle thereto.

The embodiment of Figures 1 to 7 also includes a swivel plug 24 (which may be of steel or other suitable material) adapted to interconnect the base member 10 and the cap 19. The swivel plug 24 includes a generally cylindrical head portion 25 adapted to fit snugly within the cylindrical bore 13 of the main arm 11 of the base member 10. A transverse slot 26 is formed at the outer end of the head portion 25 for cooperation with a screw-driver or other suitable tool.

The swivel plug 24 also includes a reduced elongated shank 27 formed integrally with the head 25. An axial conduit 28 extends inwardly from the front end of the shank 27 and communicates, at its inner end, with one or more radially extending apertures 29 formed in the shank 27 somewhat forward of the head 25.

Figure 3:
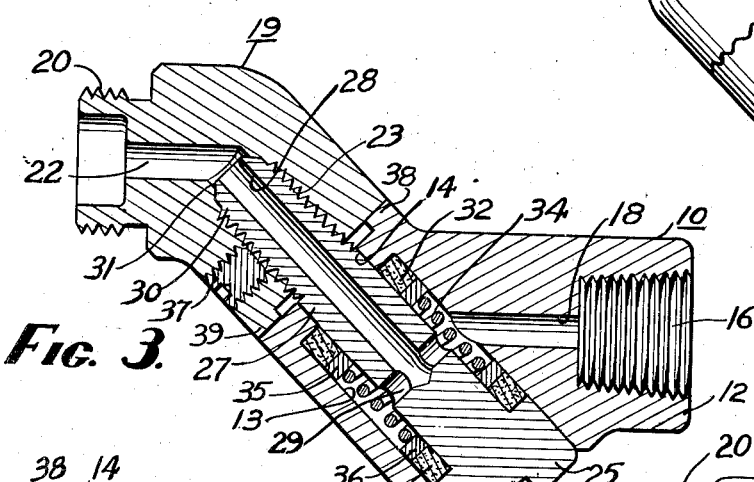
Figure 3 represents a vertical cross-sectional view of the embodiment of Figure 1.
Figure 4:
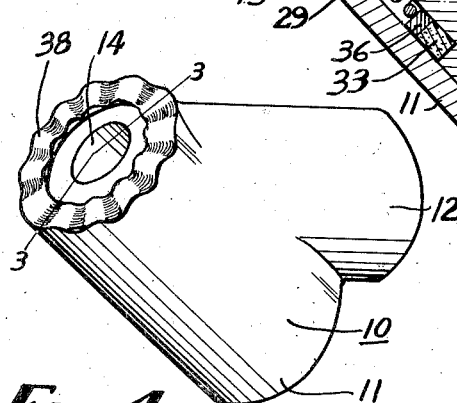
Figure 4 represents a perspective view of the Y-shaped base member forming part of the embodiment of Figures 1 to 3.
Figure 5:
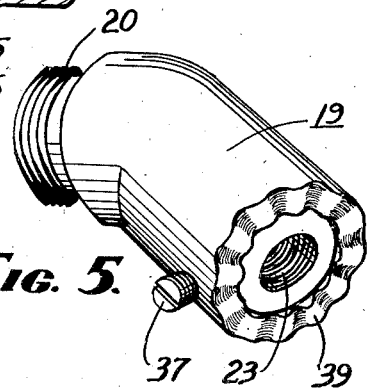
Figure 5 represents a perspective view of the front rotatable angle member or cap forming part of the embodiment of Figures 1 to 3.

The shank 27 is externally screw-threaded along its forward portion as at 30 for connection within the screw-threaded opening 23 of the cap 19. The tip 31 of the shank 27 is tapered so that, when the plug 24 is tightened within the opening 23, the tip 31 will provide a fluid-tight seal with a correspondingly-tapered shoulder formed at the inner end of the opening 23 as shown in Figure 3.

A pair of sealing gaskets 32 and 33 (of leather or other suitable compressible material) are disposed about the unthreaded portion of the shank 27. A helical spring 34 is also disposed upon the unthreaded portion of the shank 27 intermediate the gaskets 32 and 33 and is adapted to exert pressure upon said gaskets through intervening metal washers 35 and 36.

The plug 24 is adapted to be inserted from the rear end of the bore 13, through the opening 14, and into the screw-threaded opening 23. The spring 34 is so dimensioned that, when the plug 24 is seated firmly within the opening 23, the spring will be somewhat compressed, thereby to exert a rearward force upon the head 25.

The cap 19 is also provided with a set-screw 37 which is adapted to be tightened against the portion 30 of the shank 27 to lock it into position within the opening 23 and to prevent it from accidentally working loose.

The front face of the arm 11 is peripherally serrated as at 38 while the rear face of the cap 19 is correspondingly peripherally serrated as at 39.

Figure 6:
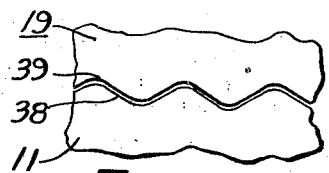
Figure 6 represents an enlarged more or less schematic fragmentary elevational view of the line of juncture of the Y-shaped base member and the rotatable member of the embodiment of Figures 1 to 3 shown as it appears with the locking serrations in interengaged locked position.

Normally, the serrations 38 and 39 are in the intermeshed position shown in Figure 6 and are maintained in this interlocked position by the spring 34 which tends to hold the base member 10 and the cap 19 together.

Figure 7:
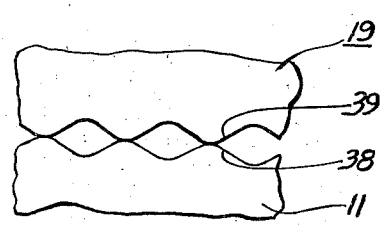
Figure 7 represents a view generally similar to that of Figure 6 but showing the locking serrations in separated position as they would appear while the swivelable front member is being rotated relative to the Y-shaped base member.

If, however, a manual rotating force is exerted upon the cap 19, the cap will be rotated relative to the base 10 whereupon the serrations 39 will move relative to the serrations 38 to the position shown in Figure 7. That is, the camming action of the serrations produces an axial component force which moves the cap 19 somewhat away from the base 10 against the force of the spring 34; the spring 34 being somewhat further compressed in the process. When the cap 19 is rotated somewhat further, the spring 34 will again snap the serrations back into the intermeshed position shown in Figure 6. Thus, the cap is now rotated through one serration relative to the base 10. In the embodiment shown in the drawings, 12 serrations are provided so that the operation described above will result in a 30 degree rotation of the cap 19 relative to the base 10.

It is apparent, therefore, that the cap 19 can be rotated through 360 degrees relative to the base 10 to position the coupler 21 in the most desirable position to effectuate connection to any lubricant-receiving nipple or fitting on an automobile chassis or the like. Thus, for example, when the cap 19 is in the position shown in Figure 1, the coupler 21 is adapted for ready connection to a horizontally-extending lubricant-receiving nipple (not shown); when, on the other hand, the cap 19 is rotated relative to the base 10 to the position shown in Figure 2, the coupler 21 is adapted for ready connection to a vertically-extending lubricant-receiving nipple.

When the cap 19 has been rotated to the desired position, and the coupler has been connected to the nipple, grease under pressure is forced through the fluid line 17, the conduit 18, the bore 13, the apertures 29, the conduit 28, the conduit 22 and the neck 20 into the coupler 21, from which it passes, in conventional manner, into the lubricant-receiving nipple of the system to be lubricated. When this occurs, the bore 13 intermediate the gaskets 32 and 33 and the washers 35 and 36 is filled with grease under a pressure of several hundred pounds per square inch. This pressure tends to force the head 25 of the plug 24 toward the rear of the bore 13, and in so doing, tends to pull the cap 19 toward the base 10. Thus, it is obvious that, when lubricant under pressure, is passing through the swivel attachment and the coupler, a force many times greater than that normally exerted by the spring 34, pulls the cap 19 and the base 10 together. This force is so great as to prevent manual rotation of the cap 19. In other words, when grease is passing through the fluid line the swivel attachment and the coupler, the cap 19 is immovably locked into position relative to the base 10 to prevent accidental rotation thereof. At the same time, the pressure of the grease within the bore 13 forces the sealing gaskets 32 and 33 into fluid-tight relationship with the bore 13 and the shank 27.

When the flow of grease is shut off through any conventional means (not shown), the pressure within the bore 13 drops so that only the spring 34 locks the cap 19 to the base 10. Thus, after sufficient grease has been forced into one nipple, cutting off of the flow of grease not only permits disengagement of the coupler from the fitting but also permits rotation of the cap 19 relative to the base 10 to facilitate connection of the coupler to a new differently-positioned nipple.

The novel swivel attachment of the present invention greatly facilitates greasing operations since it permits free swiveling of the coupler through a full 360 degrees relative to the grease line, and thus is greatly superior to conventional coupling devices heretofore employed which permit only limited swiveling and which are generally less efficient and dependable in operation.

Figure 8:
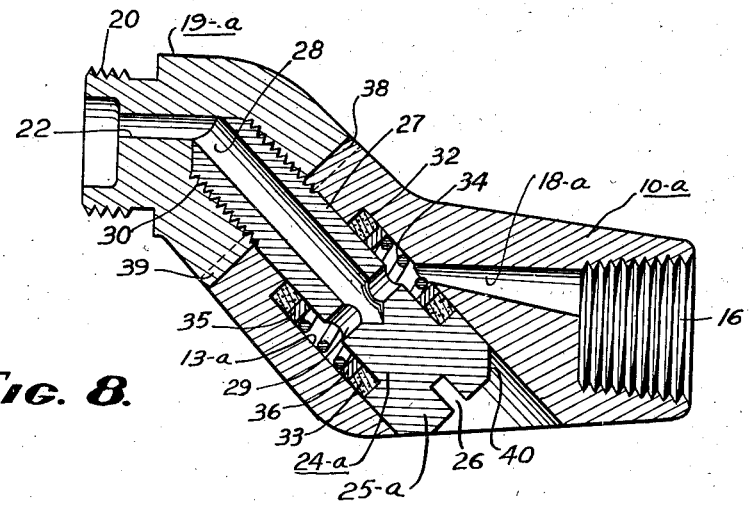
Figure 8 represents a view, generally similar to that of Figure 3, but showing another embodiment of the present invention.

In Figure 8 we have shown another embodiment of the present invention which is generally similar in construction and operation to the embodiment of Figures 1 to 7. In the embodiment of Figure 8, however, the set-screw is omitted from the member or cap 19—a.

The base member 10—a of Figure 8, instead of being Y-shaped as in the embodiment of Figures 1 to 7, is made generally smoothly curved; the cylindrical bore 13—a being somewhat shorter than the bore of Figure 3 and being formed generally at an angle to the under side of said base.

The head portion 25—a of the swivel plug 24—a is provided with a bevel 40 which extends generally flush with the open rear end of the bore 13.

The conduit 18—a is inwardly tapered from the socket 16 so as to reduce the resistance to flow of lubricant or other fluid or semi-fluid therethrough.

The operation of the embodiment of Figure 8 is the same as described hereinabove in connection with the embodiment of Figures 1 to 7.

Figure 9:
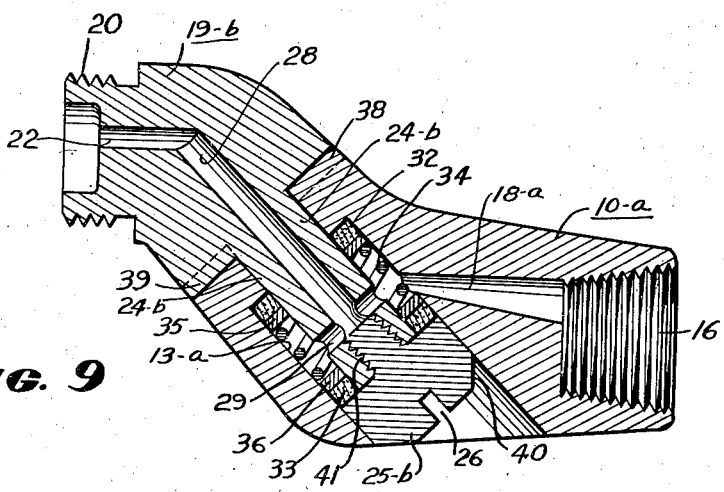
Figure 9 represents a view, generally similar to those of Figures 3 and 8, but showing still another embodiment of the present invention.

In Figure 9 we have shown still another embodiment of the present invention.

The base 10—a of the embodiment of Figure 9 is identical with the base 10—a of the embodiment of Figure 8 described hereinabove.

However, the swivel plug 24—b (instead of being a separate element adapted for removable connection to the cap as in the embodiments of Figures 1 to 8) is formed as an integral part of the cap 19—b, and the head 25—b, is screw-threadedly connected thereto as at 41.

The embodiment of Figure 9 may be assembled by first inserting the portion 24—b of the cap 19—b into the bore 13—a, thereafter installing the sealing gaskets, washers and spring on the portion 24—b from the rear end of the bore 13—a, and finally screwing on the head 25—b.

The operation of the embodiment of Figure 9 is identical with that described hereinabove in connection with the embodiment of Figures 1 to 7.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described our invention, what we claim as new and desire to protect by Letters Patent is:

1. A swivel attachment for hydraulic lubricating systems or the like comprising a base having an inlet conduit formed therein, an angle cap having an outlet conduit formed therein, said base and said cap having juxtaposed serrated faces, means swivelably connecting said cap to said base, means for spring tensioning said cap against said base whereby the juxtaposed serrated faces yieldably lock said cap relative to said base, and means actuated by hydraulic pressure of fluid passing through said attachment for immovably locking said cap in predetermined position relative to said base.

2. A swivel attachment for hydraulic lubricating systems or the like comprising a base having a cylinder formed therein and having an inlet conduit communicating with said cylinder, an angle cap having an outlet conduit and being disposed at the front end of said base, said cap and said base having juxtaposed serrated apertured faces, means swivelably connecting said cap to said base, said connecting means including a plug having a cylindrical head portion slidably disposed generally at the rear end of said cylinder and having a reduced apertured shank extending through said cylinder and connected within said cap, said apertured shank and said cylinder providing a continuous fluid passageway intermediate said inlet and outlet conduits, spring means normally tensioning said head portion rearwardly within said cylinder whereby said juxtaposed serrated faces provide yieldable interlock between said cap and said base, and means for immovably interlocking said cap and said base in fluid-tight relationship during passage of fluid under pressure therethrough.

3. A swivel attachment for hydraulic lubricating systems or the like comprising a base having a cylinder formed therein and having an inlet conduit communicating with said cylinder generally intermediate the ends thereof, an angle cap having an outlet conduit and being disposed at the front end of said base, said cap and said base having juxtaposed serrated apertured faces, means swivelably connecting said cap to said base, said connecting means including a plug having a cylindrical head portion slidably disposed generally at the rear end of said cylinder and having a reduced apertured shank extending through said cylinder and connected within said cap, said apertured shank and said cylinder providing a continuous fluid passageway intermediate said inlet and outlet conduits, sealing gaskets disposed about said shank generally at the ends of said cylinder, and a helical spring disposed about said shank generally intermediate said gaskets, said spring normally tensioning said head portion rearwardly within said cylinder whereby said juxtaposed serrated faces provide yieldable interlock between said cap and said base, said head portion being urged rearwardly within said cylinder by the hydraulic pressure of fluid passing through said attachment whereby said cap is immovably locked in predetermined position relative to said base.

4. A swivel attachment for hydraulic lubricating systems or the like comprising a base having a cylinder formed therein, an inlet conduit adapted for connection to a lubricant-delivery line, said inlet conduit being formed generally at an angle to said cylinder and communicating with said cylinder generally intermediate the ends of said cylinder, an angle cap disposed at the front end of said base, said cap having a screw-threaded opening formed therein generally co-axially with the cylinder of said base and having an outlet conduit communicating with the inner end of said screw-threaded opening and angularly related thereto, said base and said cap having juxtaposed serrated apertured faces, a swivel plug having a cylindrical head portion slidably mounted generally at the rear end of said cylinder and having a reduced apertured shank extending through said cylinder and said apertured faces, the protruding portion of said shank being externally screw-threaded, and being connected within the screw-threaded opening of said cap, said apertured shank and said cylinder providing a continuous fluid passageway intermediate said inlet and outlet conduits, compressible sealing gaskets disposed about said shank generally at the ends of said cylinder, and a helical spring disposed about said shank generally intermediate said sealing gaskets, said spring normally tensioning said head portion rearwardly within said cylinder whereby said juxtaposed serrated faces provide yieldable interlock between said cap and said base to permit positioning of said cap in any one of a plurality of rotatably-displaced positions relative to said base, said head portion being urged rearwardly within said cylinder by the hydraulic pressure of fluid passing through said attachment thereby immovably to lock said cap in predetermined position relative to said base.

5. A swivel attachment for hydraulic lubricating systems or the like comprising a base having a cylinder formed therein, an inlet conduit adapted for connection to a lubricant-delivery line, said inlet conduit being formed generally at an angle to said cylinder and communicating with said cylinder generally intermediate the ends of said cylinder, an angle cap disposed at the front end of said base, said cap having a screw-threaded opening formed therein generally co-axially with the cylinder of said base and having an outlet conduit communicating with the inner end of said screw-threaded opening and angularly related thereto, said cap having a screw-threaded neck at the front end of said outlet conduit for detachable connection to a hydraulic grease coupler or the like, said base and said cap having juxtaposed serrated apertured faces, a swivel plug having a cylindrical head portion slidably mounted generally at the rear end of said cylinder and having a reduced apertured shank extending through said cylinder and said apertured faces, the protruding portion of said shank being externally screw-threaded, and being connected within the screw-threaded opening of said cap, said cap having a set-screw adapted to lock the screw-threaded portion of said shank within the screw-threaded opening of said cap, said apertured shank and said cylinder providing a continuous fluid passageway intermediate said inlet and outlet conduits, compressible sealing gaskets disposed about said shank generally at the ends of said cylinder, and a helical spring disposed about said shank generally intermediate said sealing gaskets, said spring normally tensioning said head portion rearwardly within said cylinder whereby said juxtaposed serrated faces provide yieldable interlock between said cap and said base to permit positioning of said cap in any one of a plurality of rotatably-displaced positions relative to said base, said head portion being urged rearwardly within said cylinder by the hydraulic pressure of fluid passing through said attachment thereby immovably to lock said cap in predetermined position relative to said base.

6. A device of the character described comprising a base having a cylinder formed therein, an inlet conduit adapted for connection to a fluid-delivery line, said inlet conduit being formed generally at an angle to said cylinder and communicating therewith generally intermediate the ends thereof, an angle cap disposed at the front end of said base, said cap having an outlet conduit formed therein, an axially-apertured swivel member carried by said cap and extending within said cylinder, an enlarged head portion carried by the free end of said swivel member and adapted for fluid-tight reciprocation within said cylinder, said swivel member having a radial opening formed therein to provide a generally continuous passageway from the inlet conduit, through the cylinder, the apertured swivel member and the outlet conduit, said cap and said base having juxtaposed serrated faces formed thereon, a helical spring mounted upon said swivel member and within said cylinder, said spring normally tensioning said enlarged head portion rearwardly within said cylinder whereby said juxtaposed serrated faces provide yieldable interlock between said cap and said base to permit positioning of said cap in any one of a plurality of rotatably-displaced positions relative to said base, said enlarged head portion being urged rearwardly within said cylinder by the hydraulic pressure of fluid passing through said device from the inlet opening to the outlet opening thereby immovably to lock said cap in predetermined position relative to said base.

7. A device of the character described comprising a base having a cylinder formed therein, an inlet conduit adapted for connection to a fluid-delivery line, said inlet conduit being formed generally at an angle to said cylinder and communicating therewith generally intermediate the ends thereof, an angle cap disposed at the front end of said base, said cap having an outlet conduit formed therein, an axially-apertured swivel member formed integrally with said cap and extending therefrom into said cylinder, an enlarged head detachably connected at the rear end of said swivel member, said head being adapted for fluid-tight reciprocation within said cylinder, said swivel member having a radial opening formed therein to provide a generally continuous passageway from the inlet conduit, through the cylinder, the apertured swivel member and the outlet conduit, said cap and said base having juxtaposed serrated faces formed thereon, a helical spring mounted upon said swivel member and within said cylinder, said spring normally tensioning said enlarged head portion rearwardly within said cylinder whereby said juxtaposed serrated faces provide yieldable interlock between said cap and said base to permit positioning of said cap in any one of a plurality of rotatably-displaced positions relative to said base, said enlarged head portion being urged rearwardly within said cylinder by the hydraulic pressure of fluid passing through said device from the inlet opening to the outlet opening thereby immovably to lock said cap in predetermined position relative to said base.

ROBERT T. McELHOSE.
RICHARD R. FARRELL.

REFERENCES CITED

The following references are of record in the file of this patent:

UNITED STATES PATENTS

| Number | Name | Date |
| --- | --- | --- |
| 2,146,385 | Tear | Feb. 7, 1939 |
| 2,273,632 | Floraday | Feb. 17, 1942 |
| 1,264,594 | Barry | Apr. 30, 1918 |
| 2,116,004 | Tear | May 3, 1938 |
| 2,372,721 | Harcourt | Apr. 3, 1945 |